United States Patent
Blyler, Jr. et al.

(10) Patent No.: US 6,500,353 B1
(45) Date of Patent: Dec. 31, 2002

(54) DISPOSABLE DEVICE FOR END FINISHING OF PLASTIC OPTICAL FIBER

(75) Inventors: Lee L. Blyler, Jr., Basking Ridge, NJ (US); Gary J. Grimes, Birmingham, AL (US); Charles J. Sherman, Westminster, CO (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/344,638

(22) Filed: Jun. 25, 1999

(51) Int. Cl.$^7$ ............................................. B29D 11/00
(52) U.S. Cl. .......................... 216/24; 216/37; 216/38; 216/93; 438/31; 385/100; 385/129
(58) Field of Search .............................. 216/24, 37, 38, 216/93; 438/31; 385/100, 129

(56) References Cited

U.S. PATENT DOCUMENTS

| | | | |
|---|---|---|---|
| 3,826,259 A | | 7/1974 | Bailey .......................... 128/269 |
| 3,957,672 A | | 5/1976 | Zisman et al. ............... 252/171 |
| 4,690,727 A | * | 9/1987 | Scott et al. .................. 156/635 |
| 4,696,393 A | | 9/1987 | Laipply ....................... 206/210 |
| 4,893,956 A | | 1/1990 | Wojcik et al. ............... 401/130 |
| 5,532,310 A | | 7/1996 | Grenfell ....................... 524/463 |
| 6,126,844 A | * | 10/2000 | Hirsch .......................... 216/11 |
| 6,361,219 B1 | * | 3/2002 | Blyer et al. .................... 385/85 |

FOREIGN PATENT DOCUMENTS

| | | | | |
|---|---|---|---|---|
| EP | 0 862 070 A1 | | 9/1998 | ............ G02B/6/16 |
| JP | 61209403 | * | 9/1986 | ................. 385/123 |
| JP | 01123201 | | 5/1989 | ............ G02B/6/10 |
| JP | 1063543 A | * | 12/2000 | |
| JP | 02001033632 A | * | 2/2001 | |
| WO | WO 96/34633 | | 11/1996 | ............ A61L/15/22 |
| WO | WO 97/25637 | | 7/1997 | ............ G02B/6/20 |

\* cited by examiner

*Primary Examiner*—Sharidan Carrillo
(74) *Attorney, Agent, or Firm*—John C. Moran; Gregory J. Murgia; Peter V. D. Wilde

(57) ABSTRACT

Finishing the end of a plastic optical fiber by a device having a semi-rigid or rigid base, a solvent liner for absorbing and holding a solvent, and a re-attachable pull-off cover for keeping the solvent from evaporating when not in use. To polish the end of a plastic optical fiber, the cover is peeled off, the end of the optical fiber is contacted with the solvent liner such that solvent is transferred to the end of the optical fiber, the cover may be reapplied (using a pressure sensitive adhesive integral to either the bottom of the peel-off cover or the top of the liner), the excessive solvent, if any, is removed by using an appropriate swab, and the end of the plastic optical fiber is allowed to return to its normal state. The solvent temporarily dissolves the surface layer of the end of the optical fiber. The resulting surface tension automatically polishes the end of the optical fiber.

2 Claims, 1 Drawing Sheet

DISPOSABLE DEVICE FOR END FINISHING OF PLASTIC OPTICAL FIBER

TECHNICAL FIELD

The present invention relates to the utilization of plastic optical fiber, and, more particularly, to the finishing of the end of a plastic optical fiber for insertion into an optical connector.

BACKGROUND OF THE INVENTION

Optical plastic fibers are in general very easy to work with and are economical. An ongoing problem with the utilization of plastic optical fibers has been the problem of polishing the ends of a plastic optical fiber before insertion into an optical connector. The prior art polishing techniques have yielded connectors with a high insertion loss. These losses are typically in the 1.5 dB to 2.0 dB range. These insertion losses are high. For example, losses for multimode connectors made with silica fibers are less than 0.5 dB. Within the prior art, the finishing of ends of plastic optical fibers in the field and the manufacturing environment have utilized two or three different grits of optical polishing paper to polish the end of the optical. fiber. The utilization of optical polishing paper has resulted in the high insertion losses previously mentioned. Within the laboratory environment, it has been shown that by dipping the ends of optical fibers into an appropriate solvent that an instant good finish is achieved on the end of the optical fiber. The end finish achieved by the method of dipping the fiber into a solvent allows connector losses of typically 1 dB or lower. However, dipping optical fibers into a beaker full of solvent is not appropriate for field or factory utilization when fabricating optical connectors.

SUMMARY OF THE INVENTION

A departure in the art is achieved by an apparatus and method for finishing the end of a plastic optical fiber by a device having a semi-rigid or rigid base, a solvent liner for absorbing and holding a solvent, and a re-attachable pull-off cover for keeping the solvent from evaporating when not in use. To polish the end of a plastic optical fiber, the cover is peeled off, the end of the optical fiber is contacted with the solvent liner such that solvent is transferred to the end of the optical fiber, the cover may be reapplied (using a pressure sensitive adhesive integral to either the bottom of the peel off cover or the top of the liner), the excessive solvent, if any, is removed by using an appropriate swab, and the end of the plastic optical fiber is allowed to return to its normal state. The method works by the solvent temporarily dissolving the surface layer of the end of the optical fiber. The resulting surface tension automatically polishes the end of the optical fiber giving a better finish than that which could be achieved using optical polishing paper.

Other and further aspects of the present invention will become apparent during the course of the following description and by reference to the accompanying drawing.

BRIEF DESCRIPTION OF THE DRAWING

Referring now to the drawing.

DETAILED DESCRIPTION

Figure 1:
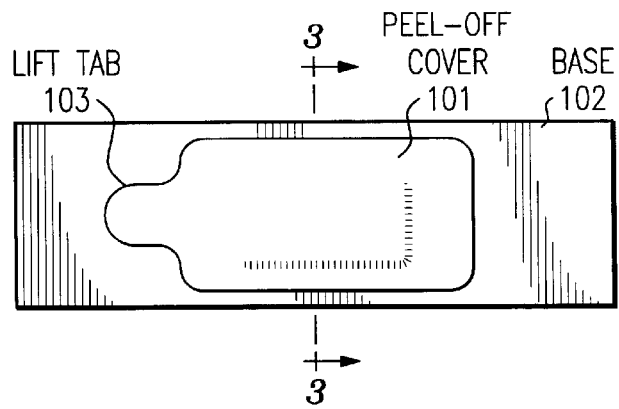
FIG. 1 illustrates a top view of a polishing device with a pull-off cover covering a solvent soaked liner attached to a base of the device.
Figure 2:
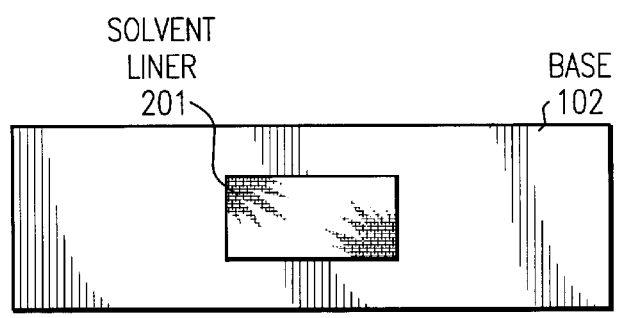
FIG. 2 illustrates a top view of the device with the pull-off cover removed.
Figure 3:
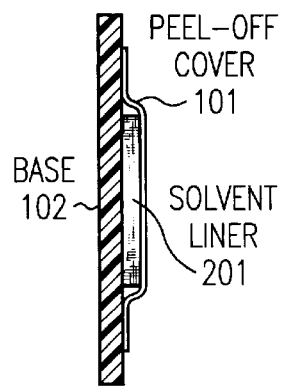
FIG. 3 illustrates a side view of the device with the pull-off cover covering the solvent soaked liner.

A device for polishing the ends of plastic optical fibers is illustrated in a top view in FIG. 1 with FIG. 2 showing the same view with the pull-off cover 101 removed. Finally, FIG. 3 illustrates a side view of the device. Base 102 can be any material that will not interact with the solvent which is placed on solvent liner 201 of FIG. 2. Such a material could be glass, however any rigid or semi-rigid material that does not interact with the solvent can be used. As will be described in greater detail, pull-off cover 101 covers the solvent liner attached to base 102 and adheres to base 102 by a pressure sensitive adhesive. Lift tab 103, which is part of pull-off cover 101, is not adhered to base 102 and is utilized to facilitate the removal either entirely or partially of pull-off cover 101.

FIG. 2 illustrates base 102 and solvent liner 201 with pull-off cover 101 being entirely removed. Solvent liner 201 is soaked in a solvent which will perform the polishing of the end of the optical fiber by dissolving the surface layer of the end of the optical fiber causing a surface tension which will automatically polish the optical fiber. Advantageously, for end finishing perfluorinated plastic optical fibers, solvents include perfluorinated solvents, such as hexafluorobenzene, PF 6050 performance fluid from the 3M Corp., and FC-77 solvent, better known as FLUORINERT®, also from the 3M Corp. If any of these perfluorinated solvents are utilized then, the pressure sensitive adhesive could advantageously be a silicone resin, a hydrocarbon material, such as polyisobutylene, natural rubber, or a polyalkyl acrylate. It is necessary that the adhesive not be attacked by the solvent. The material of solvent liner 201 can advantageously be cotton or a suitable synthetic medium. In addition, solvent liner 201 could be attached to base 102 using a suitable adhesive that does not chemically interact with the solvent. For plastic optical fibers based on other materials, such as PMMA, other solvents known to those skilled in the art would be employed.

To polish the end of a plastic optical fiber, the following steps are performed. First pull-off cover 101 is entirely peeled off or partially peeled off. Second, the plastic optical fiber is contacted with solvent liner 201 to transfer solvent to the end of the optical fiber, pull-off cover 101 is then reapplied being held in place by the pressure sensitive adhesive integral to either base 102 or pull-off cover 101. Third, if necessary, excess solvent may be removed using an appropriate swab with care being taken not to touch the end of the plastic optical fiber. After the end of the plastic optical fiber returns to its normal unsoftened state, the polishing operation is finished.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims.

What is claimed is:

1. A method for polishing the end of a plastic optical fiber comprising the steps of:
   a. providing an applicator, the applicator comprising a combination of:
      i. a rigid planar substrate,
      ii. a solvent liner for absorbing and holding a solvent, the solvent liner being attached to the substrate, and being smaller than the substrate;
      iii. a solvent absorbed into the solvent liner, and
      iv. a peel-off cover covering the solvent liner, and attached to the substrate by pressure sensitive adhesive, the peel-off cover having a tab portion extending from one end thereof, the tab portion being free of pressure sensitive adhesive and not adhered to the substrate;
   b. lifting the tab portion to peel off at least a portion of the peel-off cover to separate the peel-off cover from the solvent liner and expose the solvent liner;
   c. contacting the end of the plastic optical fiber with the solvent in the solvent liner;
   d. removing the end of the plastic optical fiber from against the solvent liner such that solvent transferred from the solvent liner to the end of the plastic optical fiber dissolves a surface layer of the end of the plastic optical fiber, thereby polishing the end of the plastic optical fiber; and
   e. re-covering the solvent liner with the peel-off cover by adhering the peel-off cover to the rigid substrate by means of the pressure sensitive adhesive.

2. The method of claim 1 wherein the solvent is hexafluorobenzene.

* * * * *